United States Patent [19]

Kitamura et al.

[11] Patent Number: 5,247,784
[45] Date of Patent: Sep. 28, 1993

[54] TRANSMISSION SYSTEM CAPABLE OF DRIVING RIGHT AND LEFT DRIVE WHEELS AT DIFFERENT SPEEDS

[75] Inventors: Junichi Kitamura; Yoshio Tomiyama; Hiroshi Oshima, all of Osaka, Japan

[73] Assignee: Kubota Corporation, Osaka, Japan

[21] Appl. No.: 865,726

[22] Filed: Apr. 8, 1992

[30] Foreign Application Priority Data

Oct. 4, 1991 [JP] Japan ................................. 3-257325

[51] Int. Cl.$^5$ ...................... A01D 34/68; B62D 11/04
[52] U.S. Cl. ...................................... 56/10.8; 56/11.1; 180/6.48
[58] Field of Search .................... 56/10.8, 11.1, 11.8; 180/6.26, 6.34, 6.48

[56] References Cited

U.S. PATENT DOCUMENTS

| | | | |
|---|---|---|---|
| 4,031,975 | 6/1977 | Engel | 180/6.48 |
| 4,809,796 | 3/1989 | Yamaoka et al. | 180/6.48 |
| 4,934,989 | 6/1990 | Furukawa et al. | 474/135 |
| 5,077,959 | 1/1992 | Wenzel | 56/11.1 |
| 5,181,579 | 1/1993 | Gilliem | 180/6.48 |

*Primary Examiner*—David J. Bagnell
*Attorney, Agent, or Firm*—Jordan and Hamburg

[57] ABSTRACT

A walking operator type lawn mower having stepless transmissions allocated to right and left rear wheels for changing speed of engine drive and outputting the drive to the right and left rear wheels, respectively, whereby the right and left rear wheels may be driven at different speeds. Right and left control members operable by a speed control lever frictionally fixable to a selected position are interlocked to change speed arms through springs, respectively. The change speed arms are pivotable, following operation of the shift levers, for controlling change speed rates of the stepless transmissions. The change speed arms are also operable by a pair of right and left auxiliary levers to move toward a backward drive position regardless of speed setting position of the speed control lever. A constant speed straight cruising run is obtained by retaining the speed control lever in a selected position to operate the change speed arms of the right and left transmissions substantially the same amount. In this state, one of the right and left auxiliary levers may be operated to shift the corresponding change speed arm from the selected speed position to a different speed position, e.g. to a lower speed position or to a backward drive position, thereby realizing a desired turning mode.

8 Claims, 7 Drawing Sheets

TRANSMISSION SYSTEM CAPABLE OF DRIVING RIGHT AND LEFT DRIVE WHEELS AT DIFFERENT SPEEDS

BACKGROUND OF THE INVENTION

1. Field of the Invention

The present invention relates to a control mechanism for controlling a transmission system capable of driving right and left drive wheels at different speeds.

2. Description of the Related Art

In the field of walking operator type lawn mower, one known example, as disclosed in U.S. Pat. No. 4,934,989, has a grass cutting unit mounted between caster type front wheels and engine-driven rear wheels, and control levers extending rearwardly for use by a walking operator in steering the mower. This lawn mower is steerable by operating transmission clutches provided for the rear wheels, respectively. That is, the mower is caused to run straight by driving the rear wheels at the same speed, and to turn round by disengaging one of the transmission clutches to place one of the rear wheels in free rotation state.

However, the mower can turn round only in a fixed way when one of the rear wheels is placed in free rotation state and only the other rear wheel is driven. It is impossible to select a small, sharp turn or a large, gentle turn according to operating conditions.

The technique of turning round a bulldozer or a tank in varied modes is known, in which right and left running devices are driven at different speeds or, when necessary, one is driven forward while the other is driven backward. However, this requires a complex and special control mechanism. It is difficult to apply such a mechanism to a walking operator type lawn mower which is required to repeat a constant speed run and a turnabout frequently for a grass cutting operation.

SUMMARY OF THE INVENTION

The object of the present invention is to provide a transmission system capable of driving right and left drive wheels at different speeds, which incorporates a simple control mechanism to enable a constant speed run and varied turning modes.

The above object is fulfilled, according to the present invention, by a transmission system comprising transmissions for separately driving right and left drive wheels at varied speeds. Shift members connected to a speed control member fixable to a selected position are connected to change speed members of the transmissions through interlocking devices. The change speed members are also connected to auxiliary control members. The auxiliary control members are operable for individually shifting the change speed members corresponding to the right and left drive wheels, by utilizing a play accommodating function of the interlocking devices regardless of the control position in which the speed control member is retained.

According to this construction, a straight run is obtained by driving the right and left drive wheels in the same direction at the same speed. A large, gentle turning run is obtained by differentiating speed of the right and left drive wheels driven in the same direction. A small, sharp turn about an intermediate position between the drive wheels may be made by rotating the drive wheels in opposite directions, to improve operability. Further, a constant speed straight cruising run is obtained by retaining the speed control member in a selected position to operate the change speed members of the right and left transmissions substantially the same amount. In this state, one of the right and left auxiliary control members may be operated to shift the corresponding change speed member from the selected speed position to a different speed position, e.g. to a lower speed position or to a backward drive position, thereby realizing a desired turning mode. Thus, a constant speed run is obtained by operating the single speed control member to set a forward speed, while allowing a small, sharp turn to provide excellent operability. The drive wheels may be driven at different speeds relative to each other or may be driven in opposite directions by operating either auxiliary control member in one direction. This realizes a simple steering control.

Other features and advantages of the present invention will be apparent from the following description of the preferred embodiments of the invention taken with reference to the accompanying drawings.

DETAILED DESCRIPTION OF THE PREFERRED EMBODIMENTS

An embodiment of the present invention will be described hereinafter with reference to the drawings.

Figure 1:
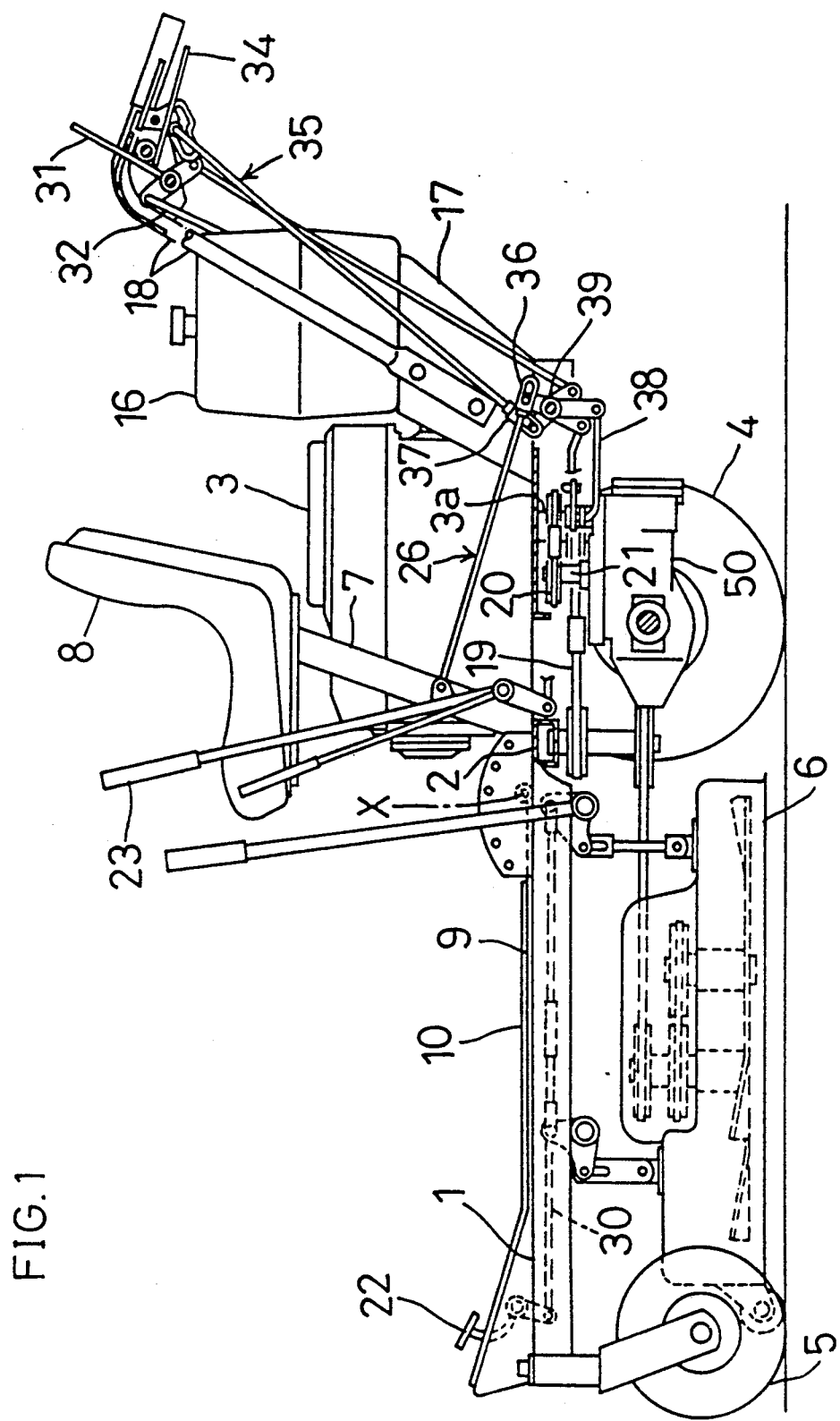
FIG. 1 is a side elevation of a lawn mower equipped with a transmission system according to the present invention.
Figure 2:
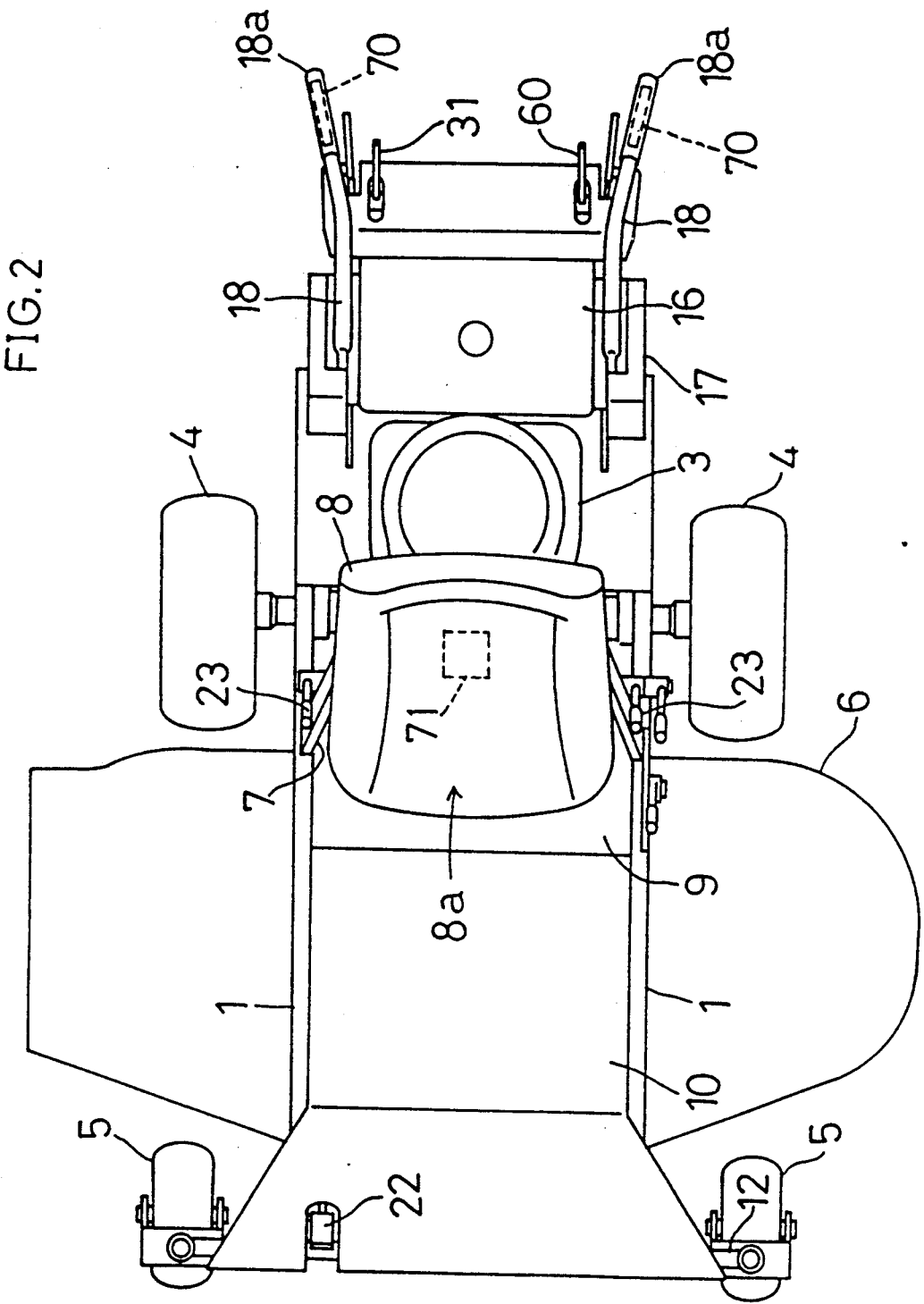
FIG. 2 is a plan view of the lawn mower shown in FIG. 1.

FIGS. 1 and 2 show a lawn mower controllable by a driver riding the mower or walking behind the mower. This lawn mower has a pair of right and left chassis frames 1 extending longitudinally thereof, and an engine supporting frame 2 extending between the chassis frames 1 for supporting an engine 3. Right and left rear wheels 4 are disposed below the engine 3, and caster type right and left front wheels 5 are disposed at forward ends of the chassis frames 1, respectively. A grass cutting unit 6 is underslung between the front wheels 5 and rear wheels 4. The rear wheels 4 have respective hydrostatic transmissions 50 mounted below the engine 3 and having output shafts coaxial with axles of the rear wheels 4. Thus, the rear wheels 4 are driven by the hydrostatic transmissions 50 independently of each other. The front wheels 5 are formed as free rotation wheels oscillatable about respective vertical axes.

Figure 3:
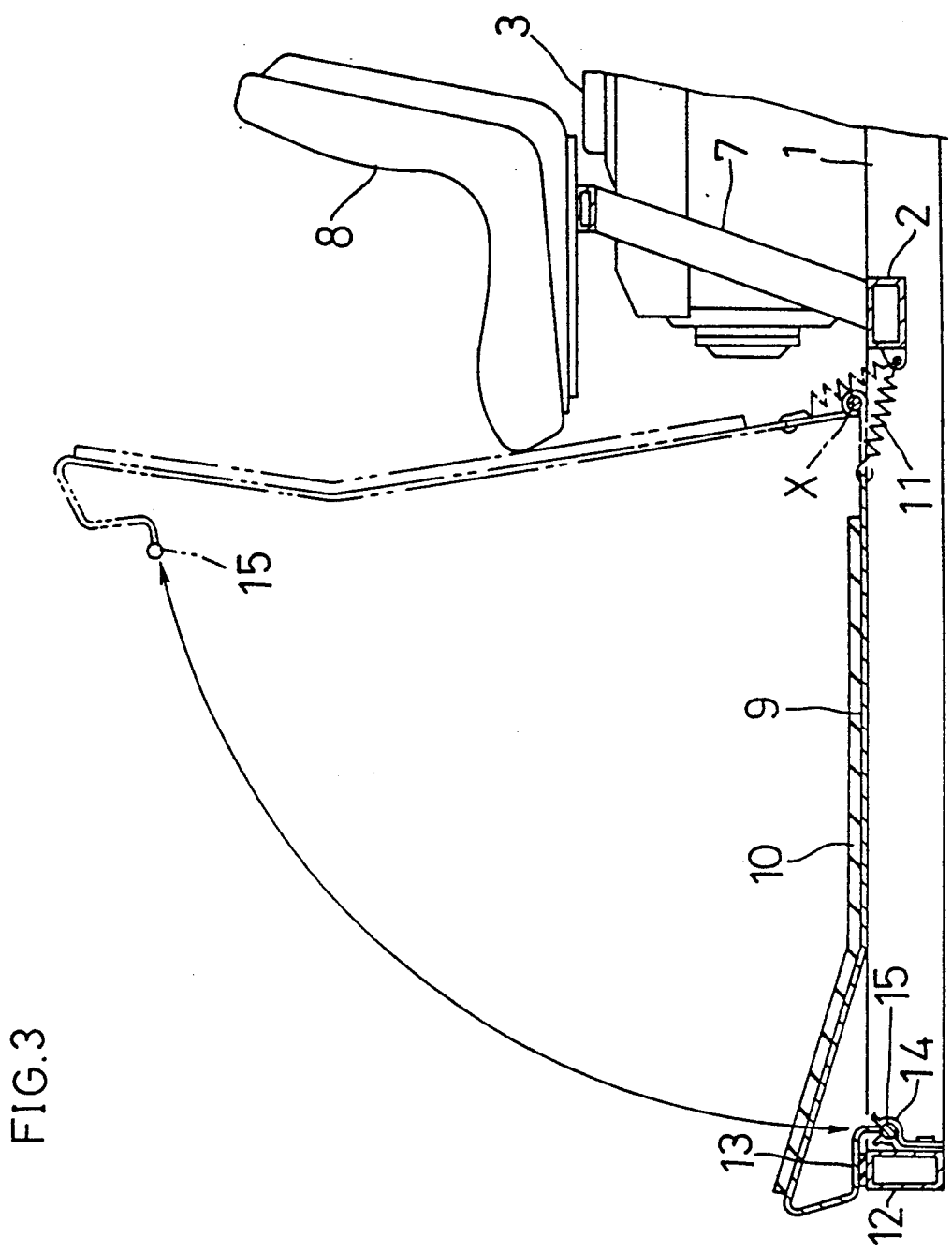
FIG. 3 is a side view of a driver's section.

The right and left chassis frames 1 support a gate-shaped support frame 7 extending over the engine 3 and supporting a drive's seat 8 thereon. When this lawn mower is used as the riding type, the driver is seated on the seat 8 disposed in a space above the engine 3. A floor step 9 is provided forwardly of the driver's seat 8 and over the grass cutting unit 6. The floor step 9 extends over an entire width between the right and left chassis frames 1, covering an area over the grass cutting unit 6. A nonslip rubber sheet 10 is placed on an upper surface of the floor step 9. The floor step 9 and driver's seat 8 define a riding control space for the driver. The floor step 9 is pivotable about a rear transverse axis X thereof between an operative or closed position covering the area over the grass cutting unit 6, and an open position revealing the grass cutting unit 6 upwardly. Opening of the floor step 9 facilitates maintenance and the like of a transmission system for driving the grass cutting unit 6. Specifically, as shown in FIG. 3, the floor step 9 is connected at a rear end thereof to the chassis frames 1 to be pivotable about the transverse axis X. The floor step 9 is biased by toggle springs 11 to the closed position and to the open position to assure safety of maintenance work. The floor step 9 has a free forward end supported by the chassis frames 1 through vibration proofing rubber elements 13, and retained in place by spring clamps 14 elastically engaging portions of the forward end. This supporting structure checks transmission of vibrations occurring during a run.

This lawn mower provides an area rearwardly thereof for the driver to walk and control behind the mower. Specifically, a fuel tank 16 is erected on a support member 17 rearwardly of the engine supporting frame 2, and a pair of right and left handle bars 18 extend upwardly and rearwardly from opposite sides of the support member 17. The driver may be seated comfortably on the driver's seat 8 in a grass cutting operation on a level ground, and may alight from the mower and control the mower while walking behind it in an operation on a sloping ground or when moving the mower over a ridge. Thus, the lawn mower may be operated with ease according to working conditions.

Figure 4:
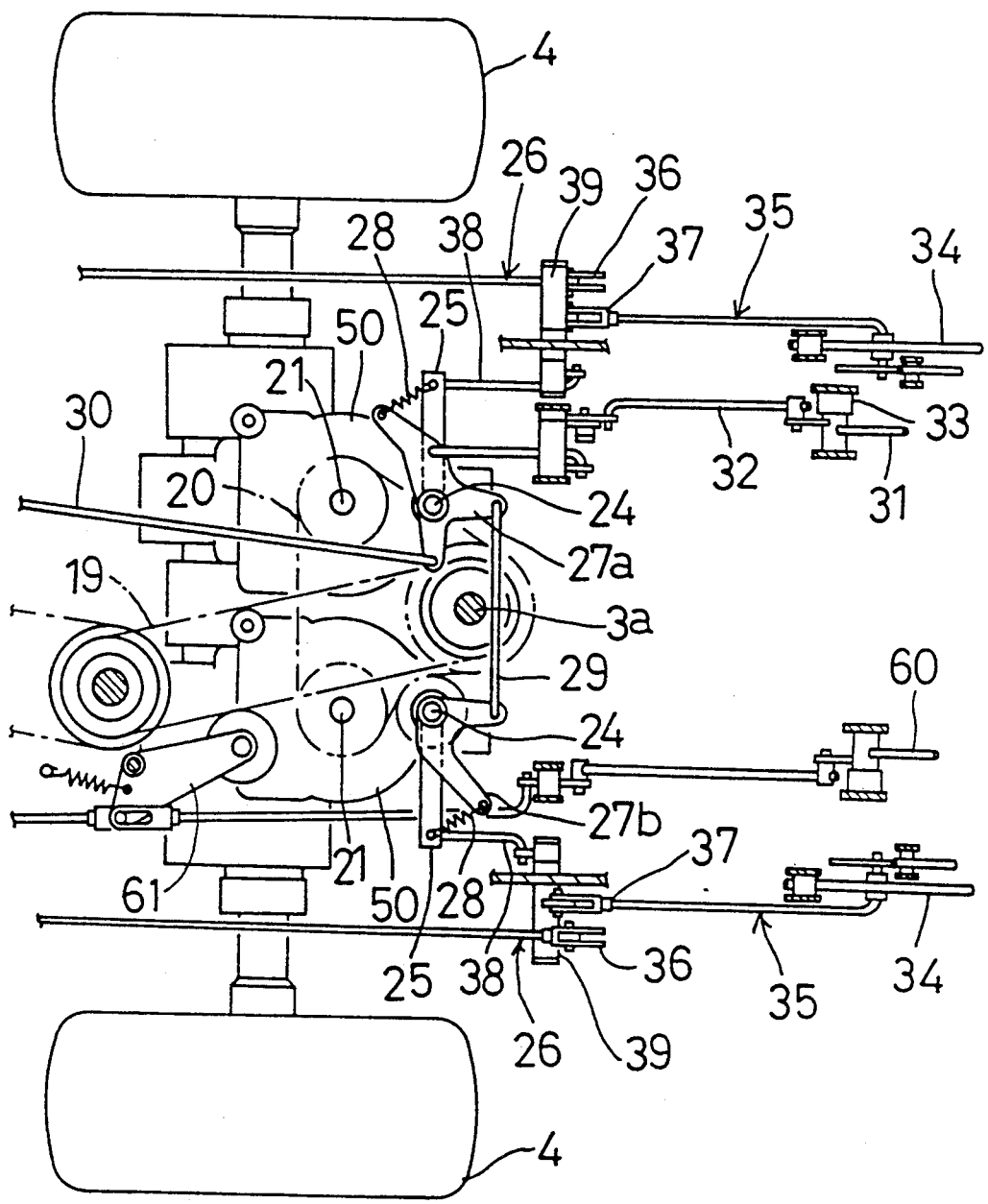
FIG. 4 is a plan view of a transmission system.
Figure 5:
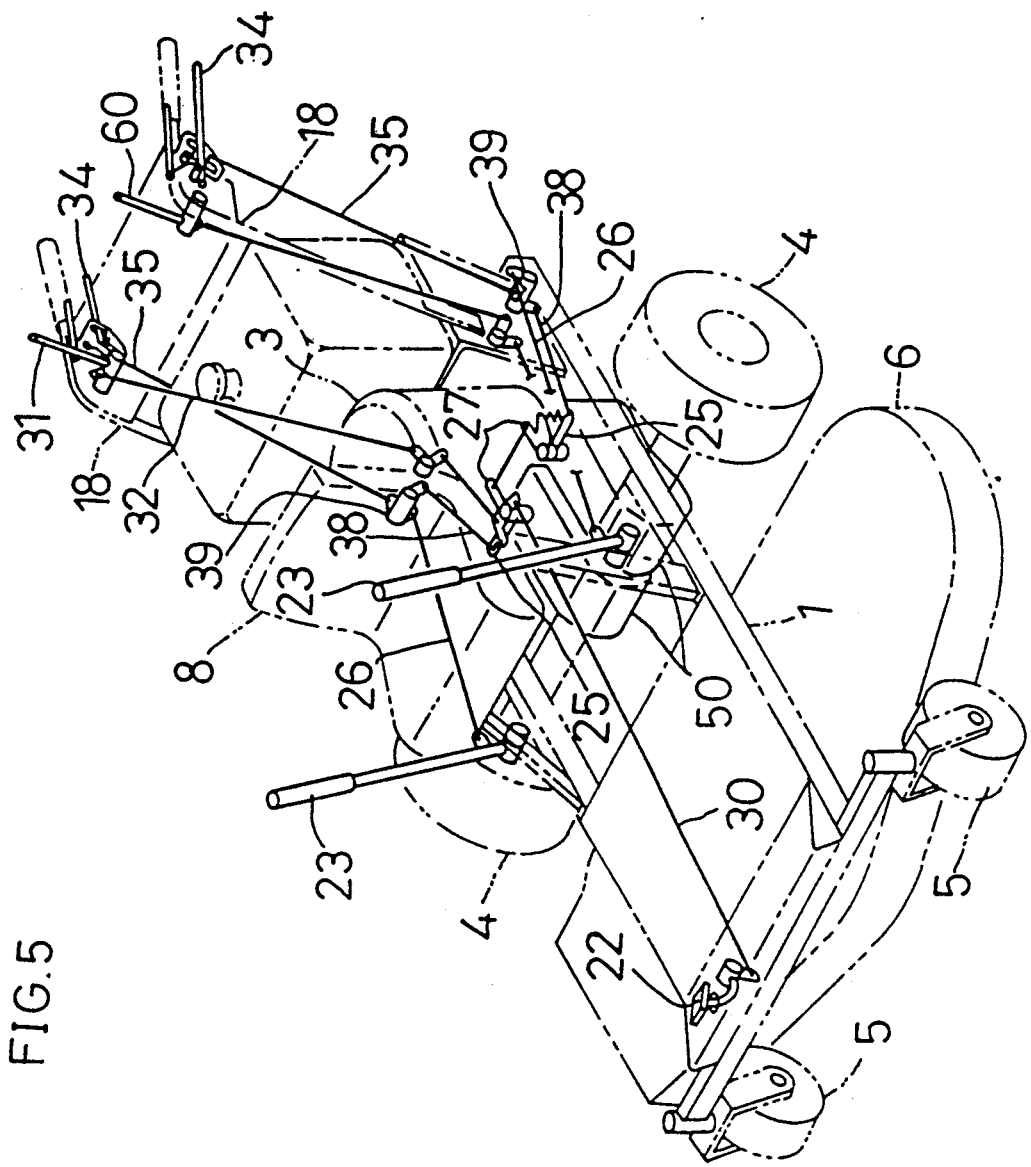
FIG. 5 is a perspective view of a control mechanism for controlling the transmission system.

The transmission system transmits drive from a vertical output shaft 3a of the engine 3 to the grass cutting unit 6 through a transmission belt 19, and to input shafts 21 of the respective hydrostatic transmissions 50 through a different transmission belt 20. Both of the hydrostatic transmissions 50 are likewise shiftable from neutral to a forward speed position by depressing a control pedal 22 provided on the floor step 9. From the forward speed position set by the control pedal 22, the hydrostatic transmissions 50 are individually shiftable to a different speed position, such as a backward speed position, by operating shift levers 23 disposed on opposite sides of the driver's seat 8. More particularly, as shown in FIGS. 4 and 5, each of the hydrostatic transmissions 50 has a speed control shaft 24 carrying a change speed arm 25 interlocked with one of the shift levers 23 through a link mechanism 26. A control arm 27a or 27b is supported to be pivotable about the same axis as and relative to the change speed arm 25. The control arm 27a or 27b and change speed arm 25 are interlocked through a tension spring 28, so that the change speed arm 25 follows pivotal movement of the control arm 27a or 27b.

The two control arms 27a and 27b are interlocked through a connecting rod 29 to be pivotable in unison. The control arm 27a is interlocked with the control pedal 22 through a link mechanism 30. In this embodiment, the control arms 27a and 27b are pivotable within a limited range so that the change speed arms 25 are pivotable within a range of displacement from neutral to a forward speed region. In other words, this limited range prohibits a shift for backward drive as a result of depression of the control pedal 22. The control pedal 22 is constantly biased by a spring to return to neutral. Each shift lever 23 is pivotable backward through an operating range to shift the change speed arm 25 against the force of the tension spring 28 to slow down forward drive and further to provide backward drive.

In a normal grass cutting operation, a maximum forward speed for straight running is set by depressing the control pedal 22 and, when necessary, the speed of the right and left rear wheels 4 is differentiated by operating one or both of the right and left shift levers 23 to turn round the lawn mower. When desired, one of the rear wheels 4 may be driven backward while the other is driven forward, to cause the mower to make a small, sharp turn about an intermediate position between the right and left rear wheels 4. Such a small, sharp turnabout of the mower has the advantage of reducing patches of grass left uncut.

Figure 6:
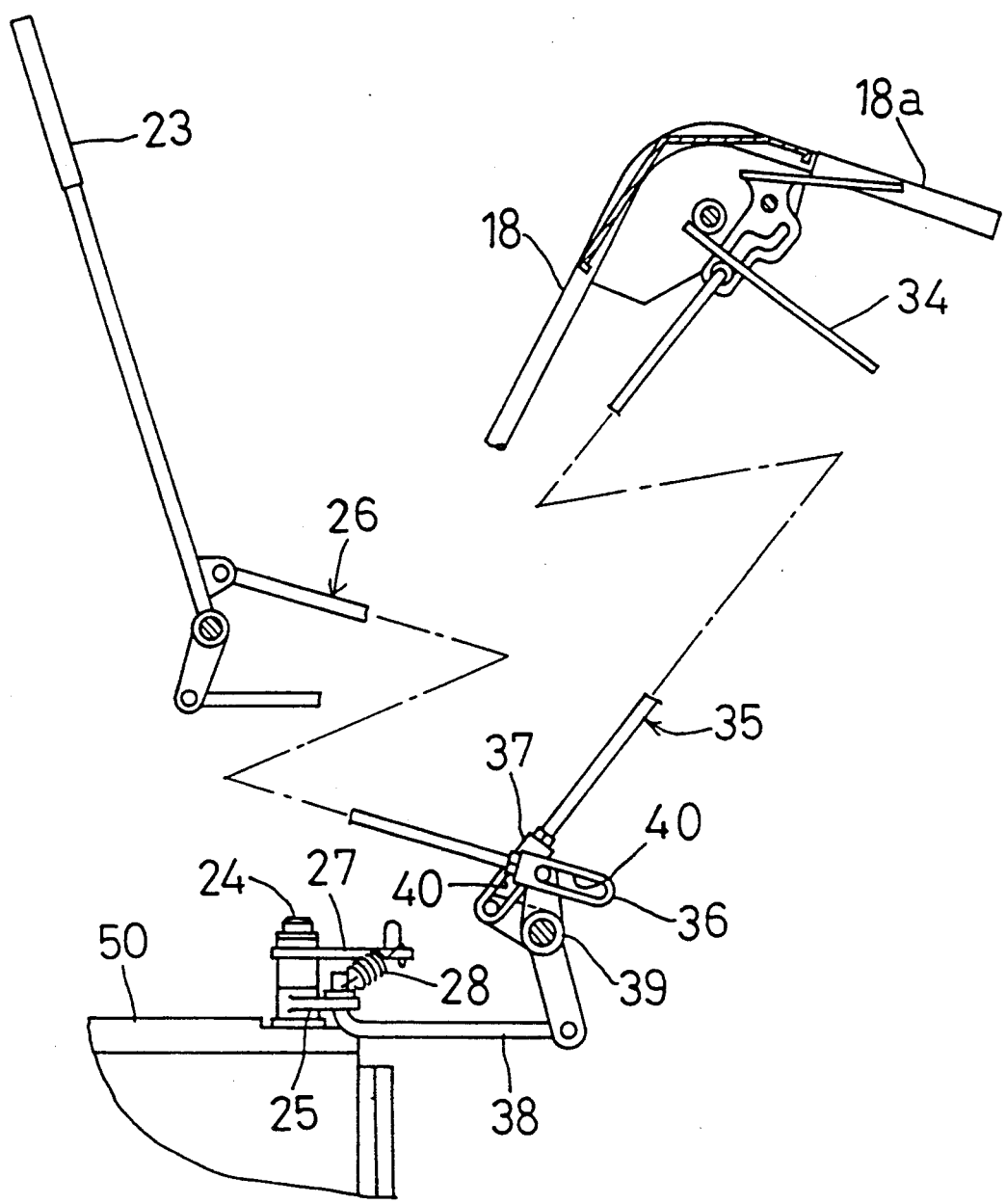
FIG. 6 is an enlarged side view of a portion of the control mechanism.

The control arms 27a and 27b are operable also by a speed setting lever 31 disposed in the rearward area for the operator to walk and control the mower. One of the control arms 27a is interlocked with the speed setting lever 31 through a link mechanism 32. The link mechanism 32 includes a disk spring type retaining mechanism 33 provided in an intermediate position thereof for retaining the speed setting lever 31 in a selected control position. The change speed arms 25 are operable also by right and left grip levers 34 provided in the rearward area. That is, the change speed arms 25 and grip levers 34 are interlocked through link mechanisms 35, respectively. Play is provided in a connection so that, when one of the grip levers 34 in the rearward area is operated, the shift lever 23 on the same side in the riding driver's section remains still. This allows a gripping operation to be effected with ease. Specifically, as shown in FIG. 6, a pivotable element 39 interlocks a link 36 connected to the shift lever 23, a link 37 connected to the grip lever 34, and a link 38 connected to the change speed arm 25. Each of the link 36 connected to the shift lever 23 and the link 37 connected to the grip lever 34 defines a slot 40 extending along a direction of pivotal movement of the pivotable element 39. Thus, when the grip lever 34 is gripped with the handle bar 18 to provide backward drive, the link 36 connected to the shift lever 23 remains inoperative because of the slot 40.

Numeral 60 in FIG. 4 denotes a control lever for operating a tightener type clutch 61 for breaking drive transmission to the grass cutting unit 6. Though not shown in the drawings, this clutch 61 is operable also by the driver riding the mower.

Engine stopper switches 70 and 71 are provided for each handgrip 18a in the rearward control area and in a seat base 8a of the driver's seat 8 in the riding control area. The switch 70 and 71 is turned off to stop the engine 3 for safety assurance when the driver leaves the seat 8 or releases one of the handgrips 18a.

The lawn mower having the described construction includes no large components such as a steering wheel or a steering column, to allow the driver to board and alight from the mower with ease. With an open space above the floor step 9, the driver has a clear view of positions forwardly of the mower, which enables an efficient grass cutting operation.

Figure 7:
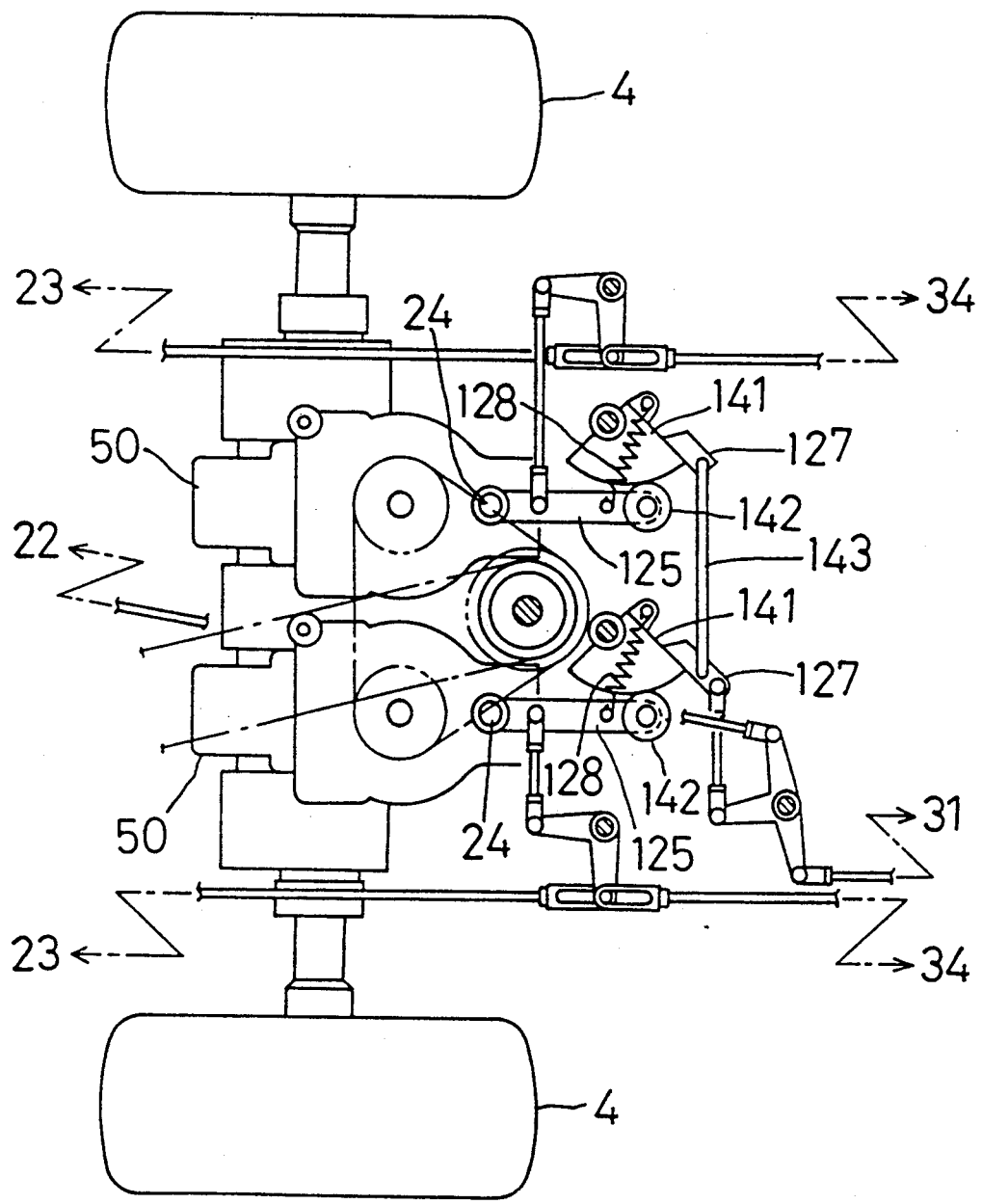
FIG. 7 is a plan view of a transmission system in a different embodiment of the invention.

FIG. 7 shows a transmission system in a different embodiment of the invention. This transmission system includes control arms 127 with cam members 141 attached thereto, respectively, and change speed arms 125 carrying cam followers 142 attached to free ends thereof, respectively. Each cam follower 142 is biased by a spring 128 for contacting and following the associated cam member 141. The control arms 127 are interlocked with the speed setting lever 31 and control pedal 22 through a connecting rod 143. Each of the change speed arms 125 may be interlocked with one of the grip levers 34 and one of the shift levers 23. The cam members 141 have an operating range for shifting the respective hydrostatic transmissions 50 from neutral to a forward drive position, while the change speed arms 125 are operable against the force of the springs 128 to shift the respective hydrostatic transmissions 50 to a backward drive position.

What is claimed is:

1. A transmission system capable of driving right and left drive wheels at different speeds, comprising:
    a first transmission for changing speed of drive and transmitting the drive to said right drive wheel, and a second transmission for changing speed of drive and transmitting the drive to said left drive wheel, each of said transmissions having a change speed member shiftable to vary a change speed rate thereof;
    shift means connected through interlock means to said change speed member of each of said transmissions;
    speed control means operatively connected to said shift means for setting the change speed members of said transmissions to a selected shift position;
    retainer means for retaining a control position of said speed control means; and
    auxiliary control means including a first link member operatively connected to said change speed member of said first transmission and a second link member operatively connected to said change speed member of said second transmission, said auxiliary control means being operable for individually shifting the change speed members by utilizing a play accommodating function of said interlock means regardless of the control position of said speed control means retained.

2. A transmission system as claimed in claim 1, wherein said interlock means includes elastic means.

3. A transmission system as claimed in claim 2, wherein said transmissions are formed of hydrostatic type stepless transmissions, and said change speed member is formed as a change speed arm pivotable through a forward drive region, a neutral position and a backward drive region for controlling a hydraulic motor.

4. A transmission system as claimed in claim 3, wherein said shift means includes a first shift arm operatively connectable through said elastic means to the change speed arm of said first transmission, a second arm operatively connectable through said elastic means to the change speed arm of said second transmission, and a connecting rod for interconnecting said first and second shift arms.

5. A transmission system as claimed in claim 4, wherein said elastic means includes a first spring having one end thereof fixed to said change speed arm of said first transmission, and the other end fixed to said first shift arm, and a second spring having one end thereof fixed to said change speed arm of said second transmission, and the other end fixed to said second shift arm.

6. A transmission system as claimed in claim 5, wherein said first shift arm is formed as a pivotable arm pivotable about an axis of said change speed arm of said first transmission, and said second shift arm is formed as a pivotable arm pivotable about an axis of said change speed arm of said second transmission.

7. A transmission system as claimed in claim 5, wherein said first shift arm is formed as a pivotable arm having a cam cooperative with a cam follower provided on said change speed arm of said first transmission, and said second shift arm is formed as a pivotable arm having a cam cooperative with a cam follower provided on said change speed arm of said second transmission.

8. A walking operator type lawn mower capable of driving right and left drive wheels at different speeds, comprising:
    an engine;
    a first transmission for changing speed of drive and transmitting the drive to said right drive wheel, and a second transmission for changing speed of drive and transmitting the drive to said left drive wheel, each of said transmissions having a change speed member shiftable to vary a change speed rate thereof;
    shift means connected through interlock means to said change speed member of each of said transmissions;
    speed setting means operatively connected to said shift means for setting the change speed members of said transmissions to a selected shift position;
    retainer means for retaining a control position of said speed setting means;
    auxiliary control means including a first link member operatively connected to said change speed member of said first transmission and a second link member operatively connected to said change speed member of said second transmission, said auxiliary control means being operable for individually shifting the change speed members by utilizing a play accommodating function of said interlock means regardless of the control positions of said speed setting means retained; and
    handle bars extending rearwardly of a mower body and carrying said speed setting means and said auxiliary control means.

* * * * *